US006583378B1

(12) United States Patent
Yamaguchi et al.

(10) Patent No.: US 6,583,378 B1
(45) Date of Patent: Jun. 24, 2003

(54) PLASMA MACHINING ELECTRODE AND PLASMA MACHINING DEVICE

(75) Inventors: Yoshihiro Yamaguchi, Ishikawa (JP); Kazuhiro Kuraoka, Ishikawa (JP); Tetsuya Kabata, Ishikawa (JP)

(73) Assignee: Komatsu Industries Corporation, Komatsu (JP)

( * ) Notice: Subject to any disclaimer, the term of this patent is extended or adjusted under 35 U.S.C. 154(b) by 0 days.

(21) Appl. No.: 09/717,140

(22) Filed: Nov. 22, 2000

(30) Foreign Application Priority Data

Nov. 26, 1999 (JP) .......................................... 11-335590

(51) Int. Cl.[7] ............................................ B23K 10/00

(52) U.S. Cl. ........................... 219/121.52; 219/121.39; 219/121.5

(58) Field of Search ....................... 219/121.52, 121.39, 219/121.44, 121.5, 121.59, 121.55, 121.51, 121.46, 74–75, 145.21; 313/231.41

(56) References Cited

U.S. PATENT DOCUMENTS

| | | | | |
|---|---|---|---|---|
| 3,504,219 A | * | 3/1970 | Gejo et al. | 313/231.41 |
| 4,392,047 A | * | 7/1983 | Bykhovsky et al. | 219/145.21 |
| 4,521,666 A | * | 6/1985 | Severance, Jr. et al. | 219/121.59 |
| 4,769,524 A | * | 9/1988 | Hardwick | 219/121.52 |
| 5,017,752 A | | 5/1991 | Severance, Jr. et al. | |
| 5,105,061 A | * | 4/1992 | Blankenship | 219/121.52 |
| 6,130,399 A | * | 10/2000 | Lu et al. | 219/121.59 |
| 6,248,972 B1 | * | 6/2001 | Yamaguchi | 219/121.39 |

FOREIGN PATENT DOCUMENTS

| | | |
|---|---|---|
| JP | 3-258464 | 11/1991 |
| JP | 4-167996 | 6/1992 |
| JP | 5-104251 | 4/1993 |
| WO | WO 93/23193 | 11/1993 |

* cited by examiner

*Primary Examiner*—Quang T. Van

(74) *Attorney, Agent, or Firm*—Armstrong, Westerman & Hattori, LLP

(57) ABSTRACT

The invention prolongs the electrode lifetime of plasma machining electrodes having a hafnium or zirconium insert. A hafnium or zirconium insert 21 inserted into the tip of a copper holder 22 protrudes from the tip of the copper holder 22. The protrusion length L is not larger than the diameter D of the insert, preferably not larger than 0.5 mm. The protruding portion 21*a* of the insert has a rounded section without sharp angles. The rear surface 21 of the insert is exposed to the flow of the cooling water inside the electrode. At least during the generation of the pilot arc, a plasma gas containing at least 5 mol % nitrogen is used.

6 Claims, 4 Drawing Sheets

PLASMA MACHINING ELECTRODE AND PLASMA MACHINING DEVICE

BACKGROUND OF THE INVENTION

1. Field of the Invention

The present invention relates to an electrode for the generation of plasma arcs used in plasma machining devices, and in particular, to an electrode having a heat-resistant insert made of hafnium, zirconium or alloys thereof, and to an improvement of the electrode structure with the purpose of improving the durability of the electrode.

In particular, the present invention prolongs the electrode lifetime in oxygen plasma cutting which is useful for cutting mild steel.

2. Description of the Related Art

Electrodes made of highly heat-resistant metals, such as tungsten (W), hafnium (Hf) or zirconium (Zr) are used in plasma machining devices, especially in plasma cutting devices. When the temperature of the electrode exceeds 3000° C. during the arc generation, it thermally emit electrons and operates as a cathode spot. Such electrodes can be broadly classified into two types, depending on their material. The first type uses tungsten, or tungsten into which small amounts of other elements have been added. The second type uses hafnium or zirconium.

These two types of electrodes are also used with different plasma gases (working gas: the gas that is turned into a plasma by the arc emission). Tungsten electrodes are used in plasma cutting devices using argon (Ar), helium (He), nitrogen ($N_2$) or hydrogen ($H_2$) either alone or as gas mixtures as the plasma gas. On the other hand, hafnium or zirconium electrodes are used in plasma cutting devices using oxygen or air as the plasma gas. That is to say, tungsten electrodes are used when the plasma gas does not contain oxygen, and hafnium or zirconium electrodes are used when the plasma gas contains oxygen. The reason for this is that tungsten alone has a very high melting point (about 3400° C.) and boiling point (about 5700° C.), but when it oxidizes, the melting point and the boiling point are lowered considerably (the melting point to about 1500° C. and the boiling point to about 2000° C.), so that it cannot be used as an insert anymore. In contrast, the melting point of hafnium and zirconium alone is a little lower (about 2200° C. for hafnium), but the melting point of their oxides is actually higher (about 2800° C. for hafnium), so that they can be used satisfactorily as inserts.

Depending on the material to be cut by plasma cutting, there are optimal plasma gas combinations for attaining a favorable cutting quality. Especially for mild steel cutting, which occupies a large proportion of applications for plasma cutting, oxygen plasma-cutting, in which a plasma containing oxygen is used, attains the best cutting quality, and has an excellent cutting speed.

The thermal conductivity of hafnium (the following explanations relate to hafnium, but the same is true for zirconium), which is the electrode material for oxygen plasma cutting, is very poor and is only one tenth of that of copper, so that if the electrode is made of hafnium alone, it is usually not cooled enough, the temperature of the hafnium rises too much, and the consumption of the hafnium may proceed rapidly. In order to prevent this, in electrodes using hafnium, usually a substantially cylindrical electrode body is made of copper, and a substantially column-shaped small piece of hafnium (referred to as "insert" in the following) is inserted into a tip, which serves as the cathode spot, of the cylindrical copper electrode body (referred to as "holder" in the following). The cylindrical copper holder is cooled by air or by water, so that the hafnium insert in its tip is. cooled due to the thermal conduction with the copper holder.

Thus, for oxygen plasma cutting, electrodes are used that have hafnium or zirconium inserts in their tips. However, since the temperature of the cathode spot exceeds 3000° C. during the plasma arc&generation, it is difficult to reduce the consumption of the hafnium or zirconium to the point where it is negligible, even using materials formed of high melting point oxides, such as hafnium oxide or zirconium oxide. Thus in the past, several techniques have been developed to reduce the electrode consumption and improve the lifetime of electrodes.

For example, the thermal shock to the electrode can be dampened by slowly increasing the arc electric current immediately after the arc ignition, which reduces the electrode consumption right after the arc ignition (see JP H05-104251A). Or, the electrode consumption immediately after the arc ignition is reduced by igniting a plasma arc with nitrogen and then switching to oxygen plasma (see JP H03-258464A). Another method that has been proposed is to reduce the electrode consumption by optimizing the insert diameter with respect to the arc electric current (see JPH07-506772A). A further method that has been proposed is to accelerate the cooling of the insert and improve the electrode lifetime by forming an intermediate layer of a silver alloy between the insert and the holder to improve the thermal conduction between the insert and the holder (see JP H04-167996A).

However, in spite of those technical improvements, the durability of electrodes is limited to a few hours in actual oxygen plasma cutting, and there is great demand for a further increase of their lifetime.

FIG. 1 shows schematically how the electrode is consumed away during the generation of an arc. The arc generation first consumes the insert 11 at the tip of the electrode 10, until it is shaped like a mortar (FIG. 1(*b*)). The speed with which the insert 11 is consumed varies with such factors as the current, the cooling of the electrode 10, the composition of the plasma gas, and the gas pressure. Moreover, as the.arc generation proceeds, the consumption of the insert 11 invades deeper to make a hole in the tip of the electrode 10 (FIG. 1(*c*)). Then, when the consumption depth d of the insert 11 (that is, the distance from the top surface of the consumed insert 11 to the top surface of the electrode 10) reaches a limit value $d_{max}$, a stable arc emission from the insert 11 becomes impossible, and arc generation becomes difficult, the arc starts to be emitted from the copper holder 12, and the copper holder 12 is consumed rapidly, which leads to destruction of the electrode 10 (FIG. 1(*d*)).

One might think that if the consumption speed of the electrode stays the same, it should be possible to prolong the possible usage time of the electrode by increasing the volume of the insert. However, if the diameter D of the hafnium insert 11 is simply increased, then the thermal conduction of the insert 11 worsens, so that the temperature inside the insert 11 rises and the consumption speed accelerates more than what the volume has been increased, thereby instead rather shortening the electrode lifetime. That is to say, there is an optimal value for the diameter D of the insert, and there is no advantage in simply enlarging it (for an invention related to the optimization of the insert diameter, see JP H07-506772A) Also even when the buried length H of the insert 11 is increased more than the limit depth $d_{max}$, the consumption does not proceed beyond the limit depth $d_{max}$. The limit depth $d_{max}$, which depends on the swirling of the plasma gas stream, the cooling of the electrode and the arc electric current, is usually about 1 mm to 2 mm and does not depend on the buried length H of the insert 11. Consequently, it is sufficient if the buried length H of the insert 11 is equal to the limit depth $d_{max}$ at least. There is no advantage in making the buried length H larger than the limit depth $d_{max}$, but this is uneconomic, because the expensive hafnium is used in excess.

SUMMARY OF THE INVENTION

Consequently, it is an object of the present invention to improve the electrode structure of a plasma machining electrode having a hafnium or zirconium insert, so as to prolong the electrode lifetime.

It is another object of the present invention to improve the arc generation conditions for this improved plasma machining electrode, so as to prolong the electrode lifetime.

A plasma machining electrode in accordance with the present invention includes a holder serving as an electrode body, and an insert inserted into a tip of the holder and joined therewith. The material of the insert is selected from group consisting of hafnium, zirconium, hafnium alloys and zirconium alloys. The insert has a protruding portion that protrudes from a tip face of the holder. The protruding portion makes the insert longer and increases the volume of the insert subject to consumption, so that the electrode lifetime is prolonged.

In a preferable embodiment, the insert is substantially cylindrical, and the protrusion length that the protruding portion of the insert protrudes from the holder top surface is not more than the diameter of the insert, for example, not more than 0.5 mm.

In a preferable embodiment, the protruding portion of the insert has a rounded profile without sharp angles.

In a preferable embodiment, the insert and the holder are joined together by a metallurgical method, such as silver brazing, considering favorable thermal conduction, but it is also possible to use a mechanical junction like pressure welding or forcing.

In a preferable embodiment, water cooling, in which cooling water flows inside the electrode, is used to improve the cooling, and the insert pierces the tip of the holder, so that the rear surface of the insert is exposed to the cooling water flow inside the electrode.

In a preferable embodiment, using the electrode as a plasma machining electrode, a plasma gas containing at least 5 mol % nitrogen is used at least when starting a first arc. To increase the electrode lifetime for oxygen plasma cutting to the maximum, a plasma gas of pure nitrogen can be used for starting.the arc, and for the main arc transition, a mixed gas of 75 to 95 mol % oxygen and 25 to 5 mol % nitrogen can be used.

Incidentally, there are conventional tungsten electrodes in which the insert protrudes from the tip face of the holder. However, in electrodes with hafnium (or zirconium) inserts, there is the following critical problem with protruding insert structures, so that they were believed to be impractical. The problem is rooted in the fact that the characteristics of tungsten and hafnium electrodes are different. More specifically, in thermal electron emission during the generation of an arc, the electrode surface of tungsten electrodes is solid, except for the vicinity of the cathode spot where the temperature is highest. In hafnium or zirconium inserts, however, a considerable portion of the insert surface is assumed to be liquid. Therefore, if the hafnium or zirconium insert protrudes from the holder, the protruding portion becomes liquid, so that this portion may be blown off. When. this blowing off of the insert occurs, the blown off portion adheres to the inside wall of the nozzle facing the electrode, which upsets the stable flow of the plasma gas and becomes a reason for cutting defects. Depending on the circumstances, it may even become a reason for arc instabilities that lead to the immediate destruction of the electrode. Therefore, to retain the liquid hafnium, in electrodes using conventional hafnium inserts, the surface of the inserts of new electrodes is coplanar with the tip face of the holder or even somewhat depressed toward the inside. The reason for depressing the insert surface below the holder surface is that when generating the first arc with a new electrode, more hafnium is consumed than at the second or further arc generations. This is, because there is no hafnium oxide formed on the hafnium surface of new electrodes, so that the consumption speed is high. Therefore, the cooling of the insert is improved by depressing the insert surface, with the goal of reducing the initial consumption. But in any case, it was conventionally believed that for electrodes with hafnium or zirconium inserts, it is not possible to let the insert protrude from the copper holder.

The present invention is revolutionary, in that it runs completely counter to that commonly held conventional belief. That is to say, as the result of many experiments performed by the inventors, it has been found that if the hafnium or zirconium insert protrudes outward, this protruding portion is not necessarily blown off by the arc generation, but may be retained at the electrode tip, which is a completely novel insight, and the present invention is based on this insight. With further experimentation performed by the inventors, several specific conditions have been pursued, under which the protruding portion of the insert is retained reliably at the electrode tip, and the volume of the protruding portion contributes to the lengthening of the electrode lifetime. These conditions are reflected by the preferred embodiments explained in detail below.

DESCRIPTION OF THE PREFERRED EMBODIMENTS

Figure 2:
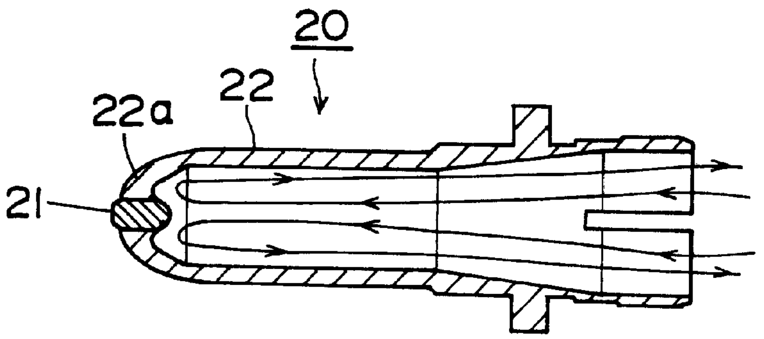
FIG. 2 is a longitudinal sectional view along a center axis of an arc machining electrode according to an embodiment of the present invention.
Figure 3:
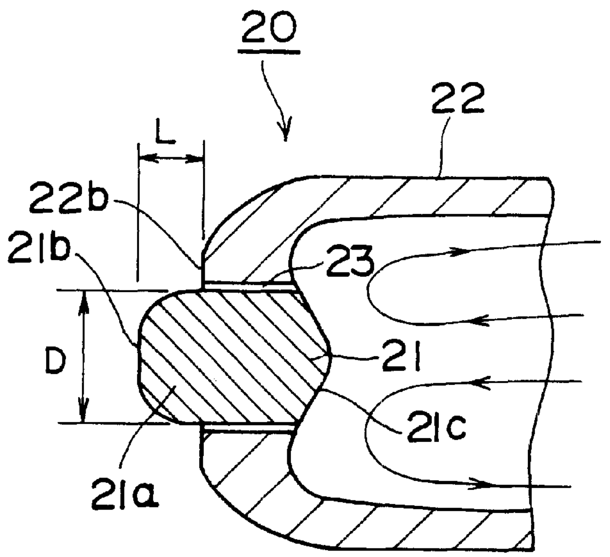
FIG. 3 is a magnification of the portion near the electrode tip of FIG. 2.

FIG. 2 is a longitudinal sectional view taken along a center axis of an electrode for arc machining in accordance with an embodiment of the present invention. FIG. 3 is a magnification of FIG. 2, showing the region near the tip of the electrode.

The electrode 20 includes a substantially cylindrical holder 22 made of copper, and a substantially column-shaped small insert 21 made of hafnium inserted into a tip 22*a* of the holder 22. A cavity inside the holder 22 functions as a flow channel for cooling water (which flows as indicated by the arrows).

When the electrode 20 is attached to a plasma torch, The tip 21*a* of the insert 21, which is placed close at the back of a nozzle of a plasma torch (not shown in the drawings), protrudes to the front (that is, toward the nozzle) from the top surface of the holder 22. The protrusion length L (the distance from the holder top surface 22*b* to the insert top surface 21*b*) is smaller than the diameter D of the insert 21 (i.e. L D). The reason for this is that if the protrusion length L of the insert 21 is larger than the diameter D, then the temperature of this protruding insert tip 21*a* rises too much, which may lead to the protruding portion 21*a* suddenly being blown off. The diameter D of the insert 21 is usually about 1 to 2 mm, so that the protrusion length of the insert 21 is not more than 1 to 2 mm, and experiments have shown that a protrusion length of not more than approximately 0.5 mm is preferable. Moreover, the protruding portion 21*a* of the insert is machined to a rounded cross section, so that it does not have any sharp angles. The reason for that is that when there are sharp angles, heat concentrates in these portions, the temperature rises, and parts may easily blown off from these angles.

To cool the insert 21 with high efficiency, the transmission of heat between the insert 21 and the holder 22 is improved by a metallurgical junction method, typically by brazing the insert 21 to the holder 22 using silver solder 23 (the second best method is to employ a mechanical junction by, for example, forcing or pressure welding the insert 21 into or to the holder 22). The insert 21 is cooled by cooling water flowing along its rear side (that is, the side that is opposite from the side facing the nozzle). To increase the cooling effect, the insert 21 pierces the holder tip 22*a*, and the rear surface 21*c* of the insert 21 is exposed to the path of the cooling water on the inside of the holder 22, and is curved so that the area which directly contacts with the cooling water is made large. Thus, the insert 21 is cooled sufficiently all the way to the protruding portion 21*a*. With regard to the efficient cooling of the insert 21, and especially with regard to sufficient cooling of the protruding portion 21*a*, cooling with water is preferable to cooling with air, and for the junction of the insert 21 and the holder 22, a metallurgical joint such as brazing is preferable to mechanical joint such as forcing or pressure welding.

Figure 4:
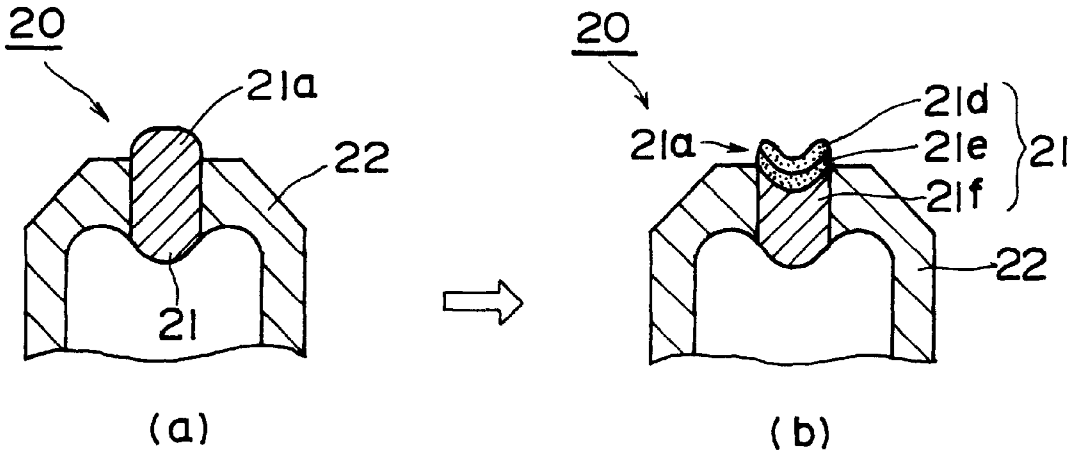
FIG. 4 is a drawing illustrating consumption in the electrode of this embodiment.

In an oxygen plasma cutting device and method using this electrode 20, it is preferable to use for the plasma gas an oxygen-nitrogen gas mixture including at least 5 mol % of nitrogen (i.e. not more than 95 mol % oxygen and at least 5 mol % nitrogen) when an arc is ignited. If igniting an arc in a plasma gas of 100 mol % oxygen, the protruding portion 21*a* of the insert 21 would be easily blown off, because especially when igniting the arc for the first time with a new electrode 20, the protruding portion 21*a* of the insert 21 is made of pure hafnium (i.e. not yet oxidized) as shown in FIG. 4(*a*), whose melting point is still low. Therefore, at least for the first arc ignition, the blowing off of the protruding portion 21*a* of the insert 21 is prevented by using an oxygen-nitrogen gas mixture containing at least 5 mol % nitrogen. After the generation of the first arc has been finished, a re-solidified layer 21*d* of hafnium oxide ($HfO_2$) with high melting point is formed on the surface of the protruding portion 21*b* of the insert, as shown in FIG. 4(*b*) (incidentally, reference number 21*e* indicates a re-solidified layer of hafnium, and reference number 21*f* indicates the hafnium portion that has stayed solid without melting). Thus, from the second time on, the hafnium oxide layer 21*d* with high melting point protects the surface of the protruding portion 21*b* of the insert, so that the problem of blowing off is not as large as during the first time, even when starting an arc with pure oxygen.

In order to maximize the life time of the electrode, as the inventors have proposed in Japanese Patent Application H11-124479 (which was not yet published at the priority application date of the present application), pure nitrogen gas can be used for the plasma gas when starting the arc (when generating the pilot arc), a mixed gas of 70 mol % to 95 mol % oxygen and 30 mol % to 5 mol % nitrogen (preferably 80 mol % to 95 mol % oxygen and 20 mol % to 5 mol % nitrogen) can be used for the plasma gas when cutting (from the transition to the main arc to the extinction of the main arc), and further it is possible to provide pure nitrogen plasma gas after the extinction of the main arc.

When an electrode 20 with the above-described structure is used under above-described plasma gas conditions, then the protruding portion 21*b* of the hafnium insert 21 is held by the electrode tip without being blown off, and hence the lifetime of the electrode is prolonged. Experimental results for this are shown in FIG. 5.

Figure 1:
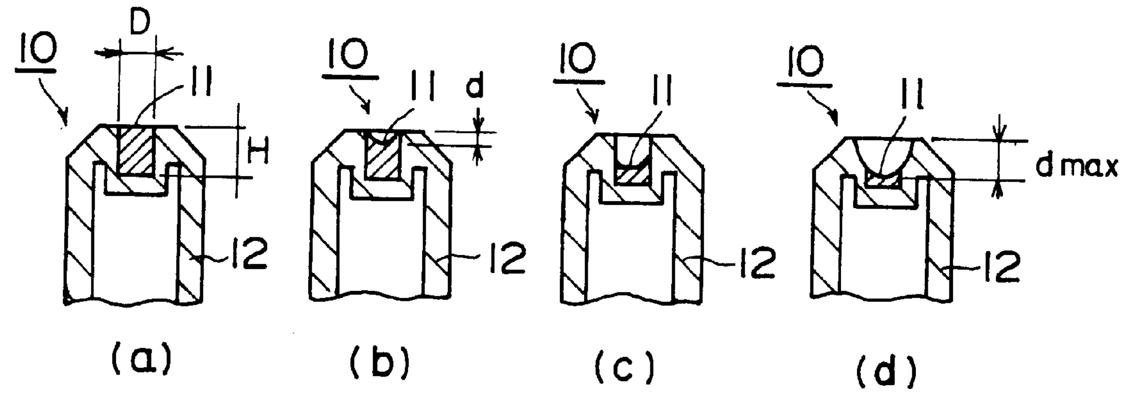
FIG. 1 is a sectional view schematically showing how a conventional electrode is consumed away by arc generation.

For the experiment, piercing operations, in each of which a main arc is generated for six seconds to drill a hole in a steel plate, are performed at a main arc current of 120A repeatedly until the destruction of the electrode, and the consumption depth d of the insert is measured after each operation. (As shown in FIG. 1, the consumption depth d is the position of the top surface of the insert measured from the top surface of the holder. when the insert forms a depression in the holder, the value of the depth d is positive, and when it protrudes from the holder, the value is negative.) For each operation, the plasma gas used to start the arc (pilot arc generation) was pure nitrogen gas, which was changed at the transition to the main arc to a mixed gas of 80 mol % oxygen and 20 mol % nitrogen, which was also used for the main arc. Two electrode samples were used: an electrode with conventional structure, in which the top surface of the hafnium insert is coplanar with the holder top surface, and an electrode in accordance with the present invention, in which the top surface of the hafnium insert protrudes for a protrusion length of L=0.5 mm from the holder top surface. In both electrode samples, the hafnium inserts were of columnar shape with a diameter D of 1.6 mm, which were silver-brazed to copper holders of the same shape and size and water-cooled from inside the holders. The vertical axis in FIG. 5 shows the consumption depth d of the electrode samples, and the horizontal axis shows the number of arc generation times (i.e. the number of the piercing operation times). The consumption depth d is taken to be zero at the position of the top surface of the holder, so that the curve for the conventional sample (curve A) starts from d=0, whereas the curve of the electrode sample of the present invention (curve B) starts from d=−0.5 mm (=−L). Under these experimental conditions, the limit consumption depth $d_{max}$ of the hafnium insert was about 1.5 mm with respect to both of the two electrode samples.

Figure 5:
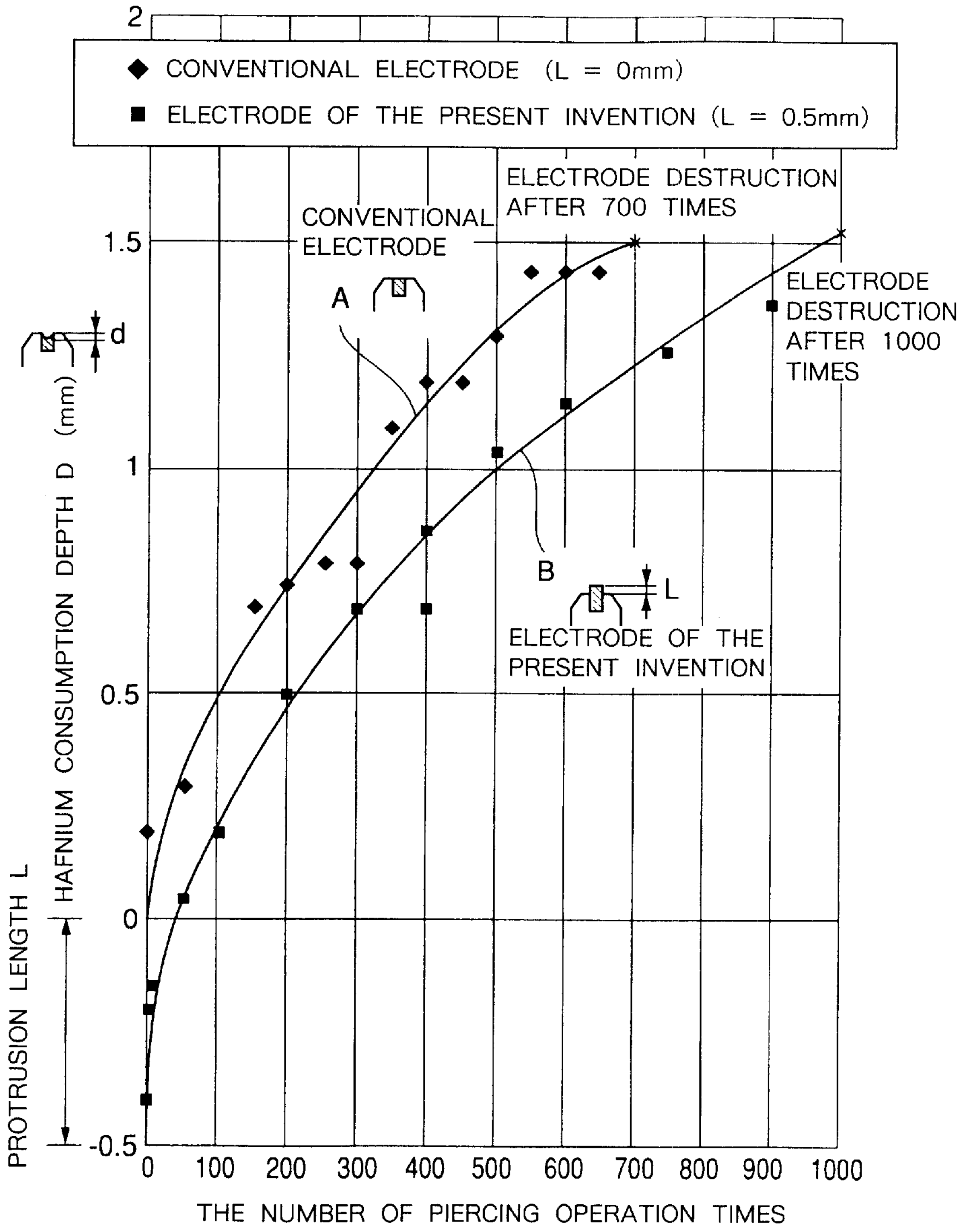
FIG. 5 is a graph showing the experimental results of tests on the lifetime of a conventional electrode and the electrode of the present invention.

As can be seen in FIG. 5, the conventional electrode sample reaches the limit consumption depth $d_{max}$ after about 700 times of arc generations. On the other hand, the electrode sample of the present invention can perform about 1000 times of arc generations before reaching the limit consumption depth $d_{max}$. As becomes clear from FIG. 5, the electrode lifetime is effectively prolonged by the insert protrusion length of 0.5 mm, which increases the lifetime of the electrode for about 40% from 700 to 1000 operation times.

Figure 6:
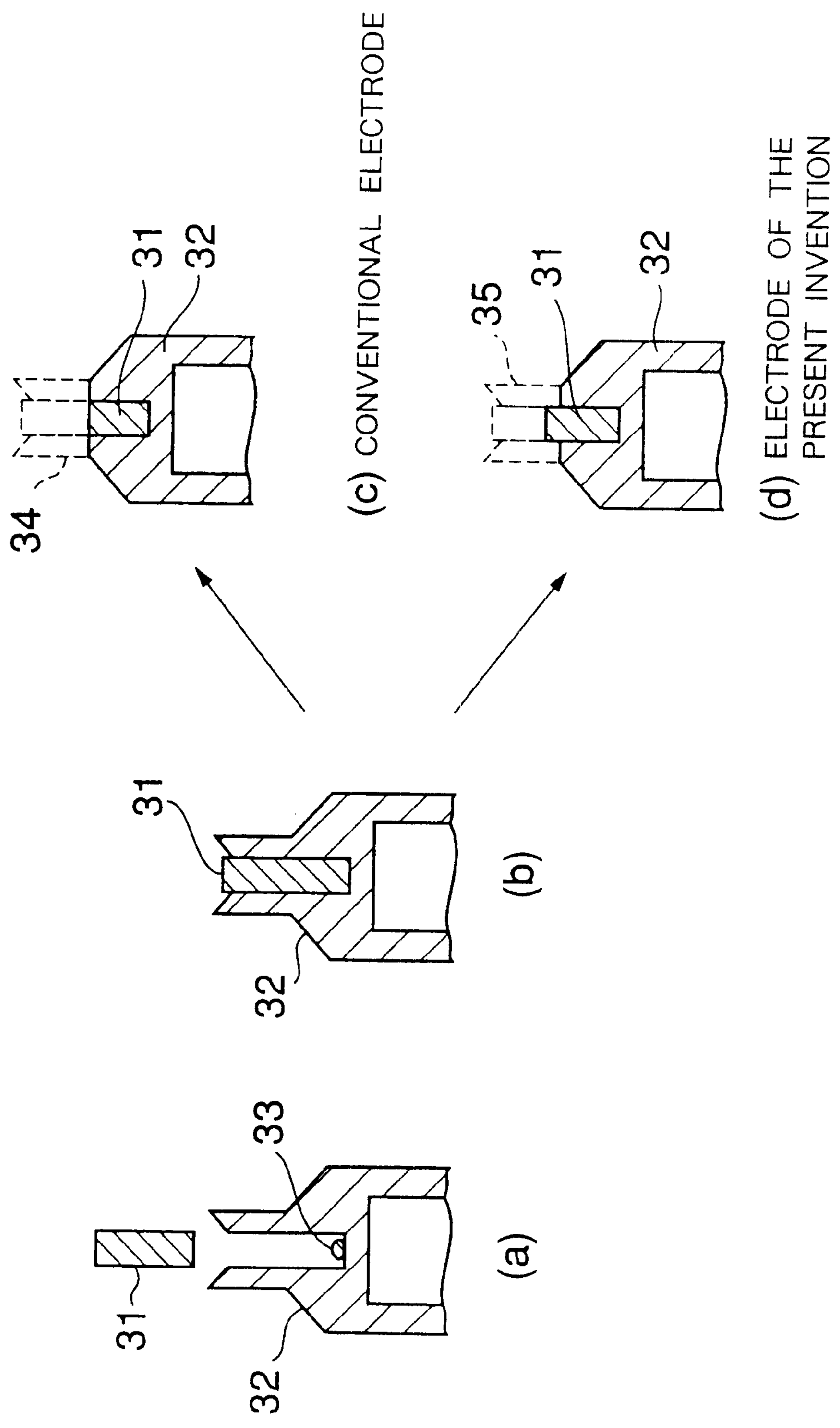
FIG. 6 illustrates embodiments of a conventional method for manufacturing electrodes and a method for manufacturing electrodes in accordance with the present invention.

FIG. 6 compares an embodiment of a method for manufacturing an electrode in accordance with the present invention with the manufacturing method of a conventional electrode.

In both manufacturing methods, first, a copper holder 32 whose shape is larger than the final shape of the electrode is manufactured, as shown in FIG. 6(*a*). Then, a long hafnium rod 31 that is longer than the final shape is inserted into an insert hole at the tip of the copper holder 32, as shown in FIG. 6(*b*), and the copper holder 32 and the hafnium rod 31 are joined by brazing with silver, forcing or the like. One possible method of brazing with silver is to first insert a small piece of silver solder 33 into the insert hole at the tip of the copper holder 32, as shown in FIG. 6(*a*). Then, the hafnium rod 31 is inserted, whereafter these parts are heated and the silver solder is melted, and the hafnium rod 31 is pushed all the way into the insert hole, so that the molten silver solder flows into the gap between the copper holder 32 and the hafnium rod 31 and fills out the gap completely. Then, the brazing of the copper holder 32 and the hafnium rod 31 is completed by cooling, as shown in FIG. 6(*b*).

Next, to produce a conventional electrode, the protruding tip portions 34 of the copper holder 32 and the hafnium rod 31 are removed completely with the finishing shown in FIG. 6(*c*), thereby eventually finishing the electrode top surface to a flat shape. On the other hand, to produce an electrode in accordance with the present invention, the protruding portion of the hafnium insert is left standing after the finishing, as shown in FIG. 6(*d*), and only the unnecessary portions 35 of the copper holder 32 and the hafnium rod 31 are cut away. Another finishing operation that is performed (but not shown in the drawings) is that the rear surface of the insert is exposed to the inside of the holder to the path of the cooling water by drilling the inside.

As can be seen from the manufacturing steps for the conventional electrode and the electrode of the present invention, the method for manufacturing an electrode in accordance with the present invention does not need more excess insert material than in the case of a conventional electrode, but leads only to a different final finished shape of the electrode face. Another advantage of the present invention is that the portion that was eliminated and thrown away in conventional finishing is used effectively as insert material.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes that come within the meaning and range of equivalency of the claims are intended to be embraced therein. For example, the invention can equally be applied to electrodes with inserts of zirconium, hafnium alloys, or zirconium alloys, instead of hafnium.

What is claimed is:

1. A structure of a plasma machining electrode, comprising:

a holder serving as an electrode body;

a permanent insert inserted into a tip of the holder and joined therewith;

wherein the material of the insert is selected from group consisting of hafnium, zirconium, hafnium alloys and zirconium alloys;

wherein the insert has a protruding portion that protrudes from a top surface of the holder;

wherein the insert is substantially cylindrical; and wherein an entire protrusion length that the protruding portion of the insert protrudes from the holder top surface is not larger than a diameter of the insert.

2. A plasma machining device using the plasma machining electrode of claim 1, wherein a plasma gas containing at least 5 mol % nitrogen is used at least when starting a first arc.

3. The plasma machining electrode of claim 1, wherein the protrusion length is less than ¼ of the diameter of the insert.

4. The plasma machining electrode of claim 1, wherein a protruding length of a cylindrical portion of the insert is less than ¼ of the diameter of the insert.

5. A plasma machining electrode, comprising:

a holder serving as an electrode body;

a permanent insert including an inserted portion that is inserted into a tip of the holder and joined therewith, and a protruding portion that protrudes from a top surface of the holder;

wherein the material of the insert is selected from the group consisting of hafnium, zirconium, hafnium alloys and zirconium alloys; and wherein a length of the protruding portion of the insert is not longer than a length of the inserted portion.

6. A plasma machining device using the plasma machining electrode of claim 5, wherein a plasma gas containing at least 5 mol % nitrogen is used at least when starting a first arc.

* * * * *